Patented June 11, 1935

2,004,546

UNITED STATES PATENT OFFICE 2,004,546

SULPHONIC ACID

Carl Wulff and Ernst Roell, Ludwigshafen-on-the-Rhine, Germany, assignors to I. G. Farbenindustrie Aktiengesellschaft, Frankfort-on-the-Main, Germany No Drawing. Application February 13, 1933, Serial No. 656,585. In Germany February 24, 1932

10 Claims. (Cl. 260—159)

The present invention relates to new sulphonic acids and a process of producing same.

We have found that sulphonation products which may serve as valuable intermediate products in the preparation of dyestuffs are obtained by subjecting diphenylbenzenes to sulphonation. The sulphonation may be effected by means of any suitable sulphonating agent, as for example chlorosulphonic acid, sulphuric acid or acetosulphuric acid. Solvents, for example, carbon tetrachloride, chloroform or orthonitrotoluene may be present during the sulphonation.

If sulphonic acids containing more than one sulphonic group are to be prepared, the sulphonation may be carried out in several stages. While the introduction of only one sulphonic group is usually effected at a temperature as moderate as possible, higher temperatures are employed for the introduction of two or more sulphonic groups.

The sulphonic acids thus obtainable or their salts, for example their alkali or alkaline earth metal salts may be converted by the usual methods into their substitution products, as for example sulpho-chlorides, sulphamides, sulphonic esters. The sulphonic and substituted sulphonic groups may also be replaced in known manner by other groups; thus for example the hydroxy compounds may be prepared and from these ethers or esters. For example by treating the hydroxy compounds under pressure with carbon dioxide, hydroxy-carboxylic acids are obtained.

Since the sulphonation proceeds in a uniform manner, numerous new and valuable substances may be obtained according to this invention in a simple manner. These substances are mainly of importance as intermediate products for the preparation of dyestuffs.

The following examples will further illustrate the nature of this invention but the invention is not restricted to these examples. The parts are by weight.

Example 1

230 parts of 1,3-diphenylbenzene having a melting point of 86° C. are dissolved in about 1800 parts of carbon tetrachloride while warming gently. The solution is cooled to from 18° to 20° below zero C. and 128 parts of distilled chlorsulphonic acid dissolved in 300 parts of chloroform are allowed to flow in while stirring vigorously, the mixture being stirred at the same temperature for 6 hours. The solution is then poured into water at room temperature while stirring. The sulphonic acid which is probably a mixture of two monosulphonic acids of 1,3-diphenylbenzene containing the sulpho group in one of the outer benzene nuclei dissolves in water while the nonsulphonated hydrocarbon remains dissolved in the organic solvent. After separating off the layer of organic solvent the sulphonic acid is converted in known manner into the sodium salt which is a loose white powder and which may be crystallized from hot water.

The sodium salt may be converted into the sulphonic acid chloride, for example by means of phosphorus pentachloride and the said chloride may be converted into the sulphamide with ammonia.

Example 2

332 parts of the sodium salt of the monosulphonic acid of 1,3-diphenylbenzene prepared in accordance with Example 1 are introduced at from 280° to 290° C. into a melt of about 500 parts of caustic potash, about 500 parts of caustic soda and 20 parts of water while stirring. The temperature is then raised to 300° C. whereby the melt becomes thinly liquid. After cooling, the reaction mixture is dissolved in water and the phenol is worked up in the usual manner. The crude phenol thus obtained in the form of a brown-black viscous mass is purified by distillation in vacuo. It distils between 208° and 220° C. at a pressure of from 2 to 3 millimetres (mercury gauge). The distillate is entirely soluble in warm dilute alkali and by fractional crystallization from a mixture of methanol and water may be split up into two substances having melting points of from 104° to 105° C. and from 64° to 65° C. respectively. The separation of the two phenols may also be effected in a smooth manner by way of the alkali salts because the phenolate of the component of higher melting point is practically insoluble in cold dilute alkali while the component of lower melting point is readily soluble. By acidification, the corresponding phenols may be isolated from the phenolates. The phenol of higher melting point is immediately precipitated in a crystalline form by acidification while the phenol of lower melting point is precipitated in an oily form by acidification and becomes solid only after standing for some time. It may be crystallized from a mixture of methanol and water and then has the melting point of from 64° to 65° C.

If the two phenols are oxidized with alkaline permanganate solution, 1,3-diphenyl carboxylic acid having a melting point of from 164° to 165° C. is formed in both cases.

The two phenols may be converted in known manner into ethers or esters and by treatment with carbon dioxide under pressure into hydroxy-carboxylic acids. The benzoate of the phenol of higher melting point melts at from 151° to 152° C. while the benzoate of the phenol of lower melting point melts at from 110° to 112° C.

*Example 3*

230 parts of 1,3-diphenylbenzene are introduced while stirring into about 600 parts of 98 per cent sulphuric acid heated to 100° C. whereby the hydrocarbon immediately dissolves in the acid. After stirring for about 3 hours at the said temperature, the conversion is completed. The reaction mixture is poured onto ice, neutralized with soda or the sodium salt precipitated with common salt. The reaction product is washed with cooled dilute common salt solution, the disulphonic acid of 1,3-diphenylbenzene being thus obtained as a white-grey powder. Probably the product corresponds to the formula

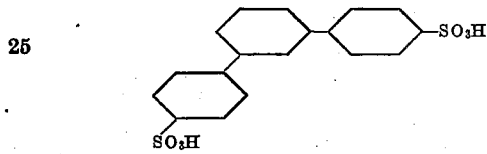

It is readily soluble in hot water and may be crystallized from a little hot water.

The sodium salt of the disulphonic acid of 1,3-diphenylbenzene may be converted in the known manner into the sulphochloride or the sulphamide.

*Example 4*

434 parts of the sodium salt of the disulphonic acid of 1,3-diphenylbenzene (see Example 3) are introduced while stirring at from 290° to 300° C. into a melt of about 600 parts of caustic potash, 600 parts of caustic soda and 50 parts of water. The temperature is then increased to from 320° to 330° C. After the melt has been kept at the said temperature for about 2 hours it is thinly liquid and entirely soluble in water. It is worked up in the usual manner and the dihydroxy compound is obtained in a good yield in the form of a grey-white powder. The crude product may be distilled in vacuo and distils at about 275° C. under a pressure of 2 millimetres (mercury gauge).

The pure substance, crystallized from xylene, has a melting point of from 170° to 171° C. The dihydroxy compound may be converted in known manner into ethers, esters or hydroxycarboxylic acids.

*Example 5*

115 parts of 1,4-diphenylbenzene having a melting point of 210° C. are dissolved in about 3800 parts of dry carbon tetrachloride. About 200 parts of chlorsulphonic acid are allowed to flow into the solution at 70° C. while stirring well, the mixture is kept at the same temperature for a further two hours and the reaction product is poured into water. The whole is shaken well, the carbon tetrachloride is separated off and the aqueous solution neutralized with soda. The solution is then concentrated and the sodium salt of the disulphonic acid of 1,4-diphenylbenzene which probably corresponds to the formula

is obtained. It is a white salt which is readily soluble in hot water and may be crystallized therefrom. By shaking the carbon tetrachloride with dilute caustic soda solution, a small amount of the disulphonic acid salt may be recovered. The yield of disulphonic acid sodium salt is about 85 per cent.

Sulphochlorides, sulphamides or the like may be readily obtained from the resulting salt by the usual methods.

*Example 6*

217 parts of the sodium salt of the disulphonic acid of 1,4-diphenylbenzene (see Example 5) are introduced at 300° C. into a melt of about 300 parts of caustic potash, 300 parts of caustic soda and 20 parts of water. After the introduction the whole is heated at from 320° to 330° C. for from 2 to 3 hours. The crude phenol thus formed, which is separated in usual manner, is a grey-green powder which distils at about 300° C. in vacuo (2 millimetres of mercury). The phenol may also be recovered by extracting the crude product with hot nitrobenzene. The pure product, which is a dihydroxy compound of 1,4-diphenylbenzene, has a melting point of 285° C.

Ethers, esters, hydroxy-carboxylic acids and the like may be prepared from the dihydroxy compound.

What we claim is:—

1. The process of producing dyestuff intermediates which comprises reacting a diphenylbenzene with a sulphonating agent.

2. Dyestuff intermediates consisting of at least one sulphonic acid of a diphenylbenzene and obtainable by reacting a diphenylbenzene with a sulphonating agent.

3. Dyestuff intermediates corresponding to the general formula $X_1-X_2-X_3$ in which $X_1$, $X_2$ and $X_3$ stand for a benzene nucleus, at least one of the nuclei $X_1$ and $X_3$ bearing at least one sulphonic acid group the said intermediates being obtainable by reacting a diphenylbenzene with a sulphonating agent.

4. Dyestuff intermediates corresponding to the general formula

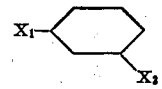

in which $X_1$ and $X_3$ stand for a benzene nucleus, at least one of the nuclei $X_1$ and $X_3$ bearing a sulphonic acid group the said intermediates being obtainable by reacting a diphenylbenzene with a sulphonating agent.

5. The dyestuff intermediate corresponding to the formula

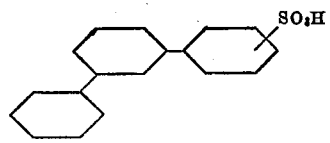

6. The dyestuff intermediate corresponding probably to the formula

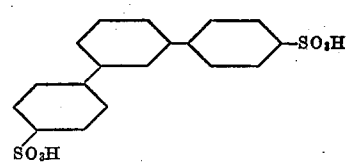

and which by melting with caustic alkali yields a dihydroxydiphenylbenzene melting in the pure state at from 170 to 171° C.

7. Dyestuff intermediates corresponding to the general formula

in which $X_1$ and $X_3$ stand for a benzene nucleus, at least one of the nuclei $X_1$ and $X_3$ bearing at least one sulphonic acid group the said intermediates being obtainable by reacting a diphenylbenzene with a sulphonating agent.

8. The dyestuff intermediate corresponding probably to the formula

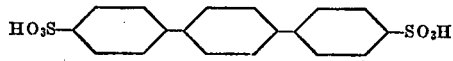

and which by melting with caustic alkali yields a dihydroxydiphenylbenzene which in the pure state has a melting point of 285° C:

9. The process of producing dyestuff intermediates which comprises reacting a diphenylbenzene with chlorsulphonic acid.

10. The process of producing dyestuff intermediates which comprises reacting a diphenylbenzene with concentrated sulphuric acid.

CARL WULFF.
ERNST ROELL.